United States Patent
Vainikainen

(10) Patent No.: US 11,060,614 B2
(45) Date of Patent: Jul. 13, 2021

(54) MECHANICAL SEAL AND A SLIDE RING THEREOF

(71) Applicant: Sulzer Management AG, Winterthur (CH)

(72) Inventor: Jukka Vainikainen, Kotka (FI)

(73) Assignee: SULZER MANAGEMENT AG, Winterthur (CH)

(*) Notice: Subject to any disclaimer, the term of this patent is extended or adjusted under 35 U.S.C. 154(b) by 0 days.

(21) Appl. No.: 16/609,995

(22) PCT Filed: Apr. 13, 2018

(86) PCT No.: PCT/EP2018/059568
§ 371 (c)(1),
(2) Date: Oct. 31, 2019

(87) PCT Pub. No.: WO2018/210504
PCT Pub. Date: Nov. 22, 2018

(65) Prior Publication Data
US 2020/0063872 A1 Feb. 27, 2020

(30) Foreign Application Priority Data
May 18, 2017 (EP) .................................... 17171811

(51) Int. Cl.
*F16J 15/34* (2006.01)
*F04D 29/12* (2006.01)
*F16J 15/16* (2006.01)

(52) U.S. Cl.
CPC ........ *F16J 15/3492* (2013.01); *F04D 29/128* (2013.01); *F16J 15/3404* (2013.01);
(Continued)

(58) Field of Classification Search
CPC ...... F16J 15/3492; F16J 15/34; F16J 15/3436; F16J 15/3464; F16J 15/3404;
(Continued)

(56) References Cited

U.S. PATENT DOCUMENTS

| 2,230,881 A | 2/1941 | Browne |
| 4,497,493 A * | 2/1985 | Sall ...................... F16J 15/3404 |
| | | 277/306 |

(Continued)

FOREIGN PATENT DOCUMENTS

| CN | 86106617 A | 6/1987 |
| CN | 103953732 A | 7/2014 |

(Continued)

OTHER PUBLICATIONS

International Search Report and Written Opinion dated Jun. 21, 2018 in corresponding International Patent Application No. PCT/EP2018/059568, filed Apr. 13, 2018.

*Primary Examiner* — Nathan Cumar
(74) *Attorney, Agent, or Firm* — Global IP Counselors, LLP

(57) ABSTRACT

A mechanical seal has a rotary part and a non-rotary part, the rotary part having at least a rotary slide ring and a rotary slide ring carrier, and the non-rotary part having at least a non-rotary slide ring and a non-rotary slide ring carrier. The mechanical seal includes a circumferential groove in one of the rotary slide ring and the non-rotary slide ring and a sensor in communication with the mechanical seal.

8 Claims, 4 Drawing Sheets

(52) U.S. Cl.
CPC ........... *F04D 29/122* (2013.01); *F16J 15/162* (2013.01); *F16J 15/3496* (2013.01)

(58) Field of Classification Search
CPC .. F16J 15/3412; F16J 15/3424; F16J 15/3496; F16J 15/16; F16J 15/50; F16J 15/52; F16J 15/162; F16J 15/324; F16J 15/40; F04D 29/128; F04D 29/12; F04D 29/122; F04D 29/124; F04D 29/126
USPC ........................................................ 277/306
See application file for complete search history.

(56) References Cited

U.S. PATENT DOCUMENTS

| | | | |
|---|---|---|---|
| 4,722,534 A | 2/1988 | Wentworth | |
| 5,490,682 A | 2/1996 | Radosav et al. | |
| 6,065,345 A | 5/2000 | Holenstein et al. | |
| 6,360,610 B1 | 3/2002 | Jarzynski et al. | |
| 8,527,214 B2 | 9/2013 | Horak | |
| 2001/0052676 A1* | 12/2001 | Omiya | F16L 27/087 277/614 |
| 2002/0089123 A1* | 7/2002 | Azibert | F16J 15/3472 277/370 |
| 2005/0016303 A1* | 1/2005 | Jacobs | F16J 15/3492 73/865.9 |
| 2010/0111705 A1* | 5/2010 | Sato | F25B 31/002 417/32 |
| 2018/0156219 A1* | 6/2018 | Maruyama | F04D 29/70 |

FOREIGN PATENT DOCUMENTS

| | | |
|---|---|---|
| CN | 104379974 A | 2/2015 |
| CN | 205047847 U | 2/2016 |
| CN | 205155147 U | 4/2016 |
| FR | 2549597 A1 | 1/1985 |
| GB | 2430034 A | 3/2007 |
| GB | 2439934 A | 1/2008 |
| JP | 5867824 B2 | 2/2016 |

* cited by examiner

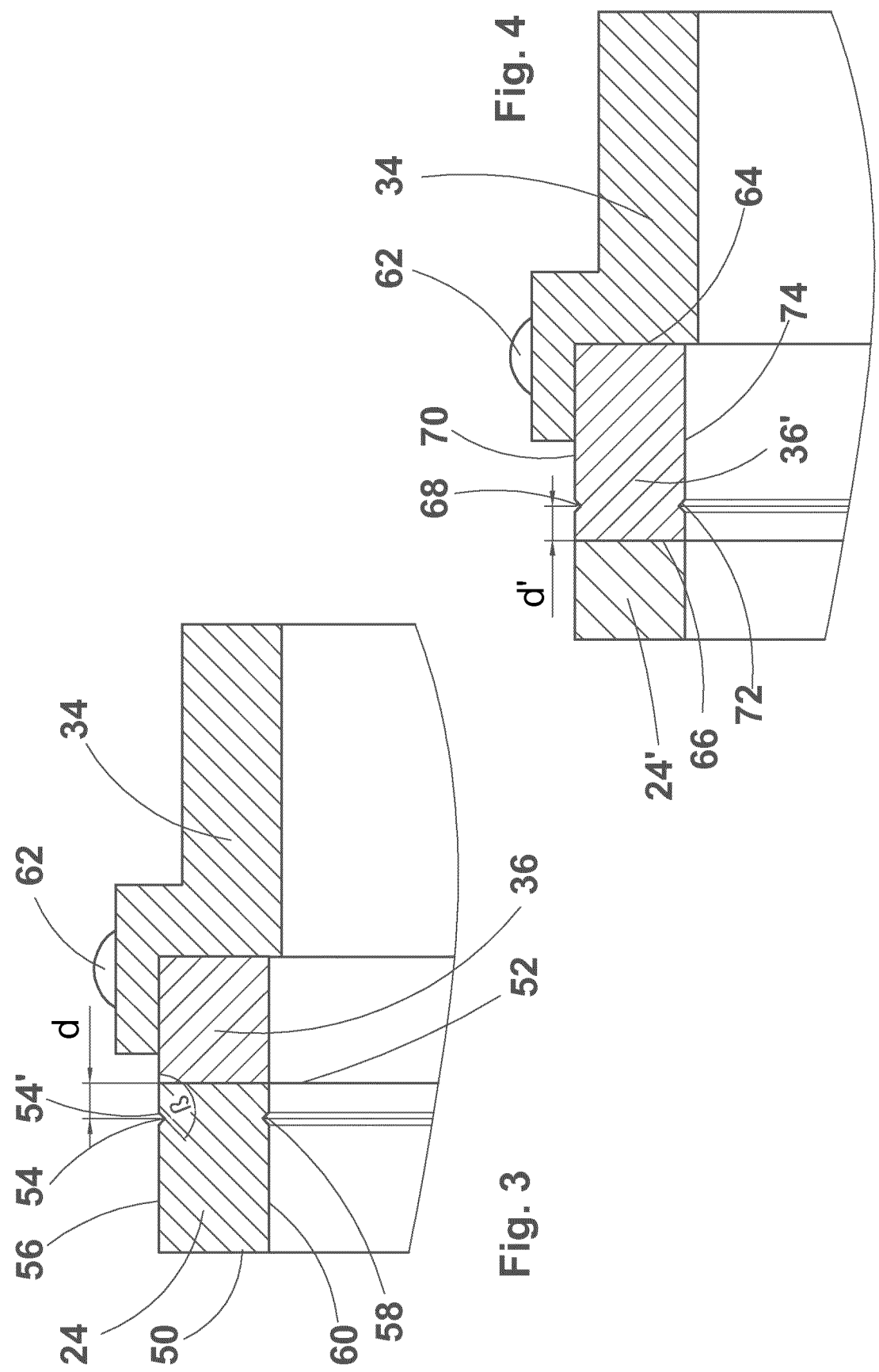

MECHANICAL SEAL AND A SLIDE RING THEREOF

CROSS-REFERENCE TO RELATED APPLICATION

This application is a U.S. National Stage application of International Application No. PCT/EP2018/059568, filed Apr. 13, 2018, which claims priority to European Patent Application No. 17171811.7, filed May 18, 2017, the contents of each of which are hereby incorporated herein by reference.

BACKGROUND

Field of the Invention

The present invention relates to a mechanical seal and a slide ring.

Background Information

Mechanical seals are gaining more and more acceptance in various shaft sealing applications. The mechanical seals find use in various pumps, mixers and agitators. Mechanical seals are of relatively simple construction, they endure high temperatures and their maintenance and service is relatively easy. But, just like all types of seals, their lifetime is hard to predict. It is also quite impossible to perform any visual monitoring of the condition of the seal. Therefore, prior art includes numerous documents that discuss the monitoring of the condition of a mechanical seal.

U.S. Pat. No. 6,065,345 discusses a method of monitoring the condition of a mechanical seal in an apparatus provided with a rotating part, in particular in a pump, which has a rotating shaft for the forwarding of a fluid, the sound emission of the seal is continually measured at discrete times in the operating state of the apparatus and at least one statistical characteristic value is won from the acoustic signals. The goal in the above discussed patent is to monitor the sliding condition of the seal. In other words, if the seal is starting to run dry, i.e. the flushing is, for some reason, not working properly, the acoustic emission from the seal changes with the condition of the lubricating film. The US-patent discusses also the effect of the speed of rotation of the pump, the temperature of the flushing liquid, the pressure of the fluid to be pumped, etc. to the acoustic emission of the seal, whereby the acoustic emission can change even if the sliding conditions were not changed.

U.S. Pat. No. B1-6,360,610 discusses a system and a method that are particularly suited for monitoring the interface of two liquid lubricated mechanical seal faces. The system monitors an interface by using a wave source to produce an ultrasonic shear wave, directing the wave at the interface, detecting the wave after it interacts with the interface, and comparing the detected wave to predetermined wave characteristics. Based on the comparison, an alarm can be triggered. The alarm can indicate that the mechanical seal is failing. In a preferred example, the approach involves detecting the collapse of the lubricating film between the seal faces and detecting excessive asperity contact. The collapse of the lubricating film and excessive asperity contact are precursors to seal failure. An ultrasonic transducer is placed behind one of the seal faces and used to produce ultrasonic shear waves (at a known frequency and amplitude) which propagate toward the interface between the two seal faces. By monitoring the amplitudes of the waves transmitted through or reflected by the interface, one can detect film collapse and the degree of contact between the faces.

Yet another document discussing the condition of the fluid film between the slide surfaces is GB-A-2430034. It discloses a condition monitoring system, using at least one acoustic emission sensory device to indirectly and/or remotely monitor the health status of a piece of rotating equipment, and applications thereof as for example a mechanical seal or a bearing assembly. The acoustic emission sensory device can be placed in direct or indirect contact to counter rotating surfaces. The signal emitted by the acoustic emission sensory device can be amplified, filtered for background noise, computed, compared to reference values and stored on a data storage device.

U.S. Pat. No. B2-8,527,214 discusses a mechanical device showing the degree of wear of the slide surfaces of the mechanical seal. The discussed mechanical device is, on the one hand, a simple device measuring the physical axial movement of a slide ring due to wear, but, on the other hand, in most applications it is, in practice, quite hard to arrange such in connection with a mechanical seal. Especially, it would also be difficult to arrange a follower to be in mechanical contact with the rotary slide ring carrier the axial movement of which is to be measured, as instructed in the patent.

In other words, the above cited prior art discusses either abnormal operating conditions in which the lubrication of the mechanical seal surfaces has failed or is about to fail, or wear in normal operating conditions. However, the monitoring of wear in normal operating conditions, requires, in accordance with prior art such an arrangement that is, though in principle simple, hard to construct and includes a great risk of functional failure, as the follower discussed in the cited patent (U.S. Pat. No. B2-8,527,214) is apt to wear, too.

SUMMARY

An object of the present invention is, thus, to solve at least one of the above discussed problems.

Another object of the present invention is to increase the reliability and predictability of the operation of a mechanical seal.

Yet another object of the present invention is to introduce a mechanical seal with a reliable and simple means or manner for monitoring the wear of the mechanical seal in normal operating conditions.

According to an embodiment of the present invention a mechanical seal has a rotary part and a non-rotary part. The rotary part is formed at least of a rotary slide ring having a second axial end with an area and a rotary slide surface, and of a rotary slide ring carrier, the non-rotary part being formed at least of a non-rotary slide ring having a second axial end with an area and a non-rotary slide surface and of a non-rotary slide ring carrier. The mechanical seal further includes an element changing the area of the second axial end of one of the rotary slide ring and the non-rotary slide ring, and a sensor in communication with the mechanical seal wherein the sensor is one of an acoustic, vibration and acceleration sensor.

According to an embodiment of the present invention the slide ring for a mechanical seal has an inner circumferential surface, an outer circumferential surface, a first axial end, a second axial end with a slide surface and an area, and an element changing the area of the second axial end of the slide ring, wherein the element is located in or on at least the inner circumferential surface.

This provides a mechanical seal the reliability of which is considerably improved.

The exemplary embodiments of the invention presented in this patent application are not to be interpreted to pose limitations to the applicability of the appended claims. The verb "to comprise" is used in this patent application as an open limitation that does not exclude the existence of also non-recited features. The features recited in depending claims are mutually freely combinable unless otherwise explicitly stated.

BRIEF DESCRIPTION OF THE DRAWINGS

The invention will be explained in more detail hereinafter with reference to the drawings.

FIG. 3 illustrates an enlarged cross section of a part of the mechanical seal of FIG. 2.

FIG. 4 illustrates an enlarged cross section of a part of the mechanical seal in accordance with a second preferred embodiment of the present invention.

DETAILED DESCRIPTION OF THE EMBODIMENTS

Figure 1:
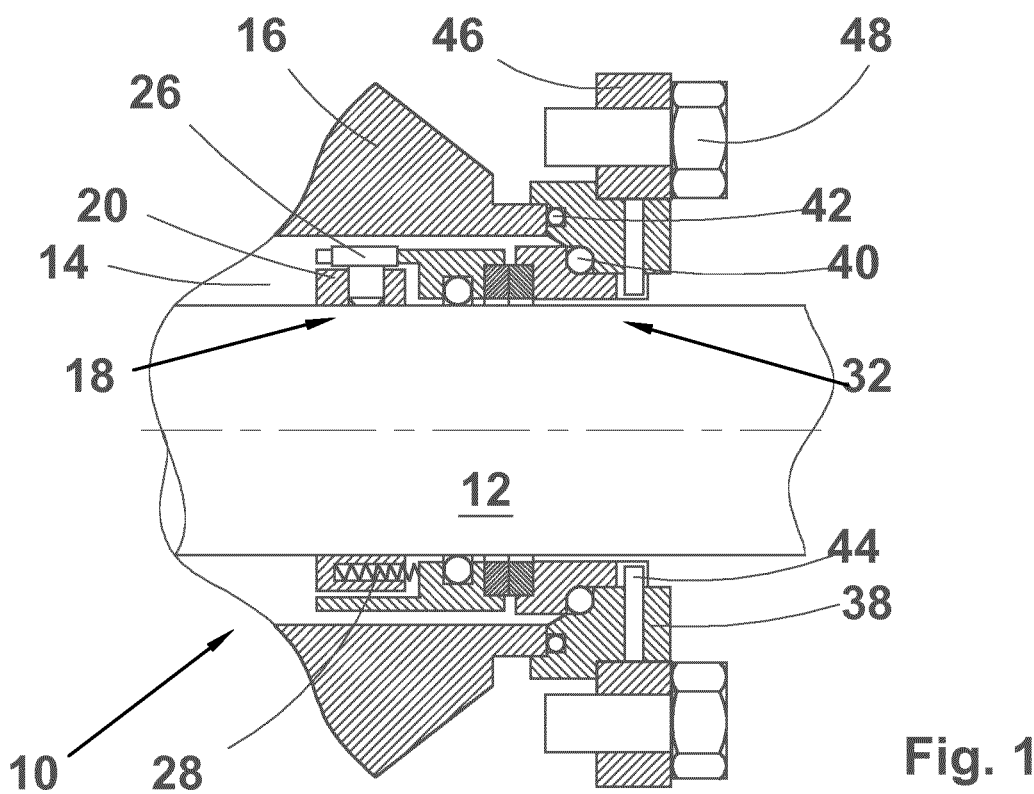
FIG. 1 is a general representation of a prior art mechanical seal.

FIG. 1 depicts schematically and exemplarily a single-acting mechanical seal 10 though the present invention is, naturally, applicable to double-acting mechanical seals, too. The mechanical seal 10 is used for sealing the shaft 12 of, for instance, a flow machine such that the interior of the flow machine, at the left hand side of the seal, is kept separate from the atmosphere, at the right hand side of the seal. The mechanical seal 10 is positioned in a seal chamber 14 disposed within a specific seal housing 16 or within a casing cover of a flow machine.

Figure 2:
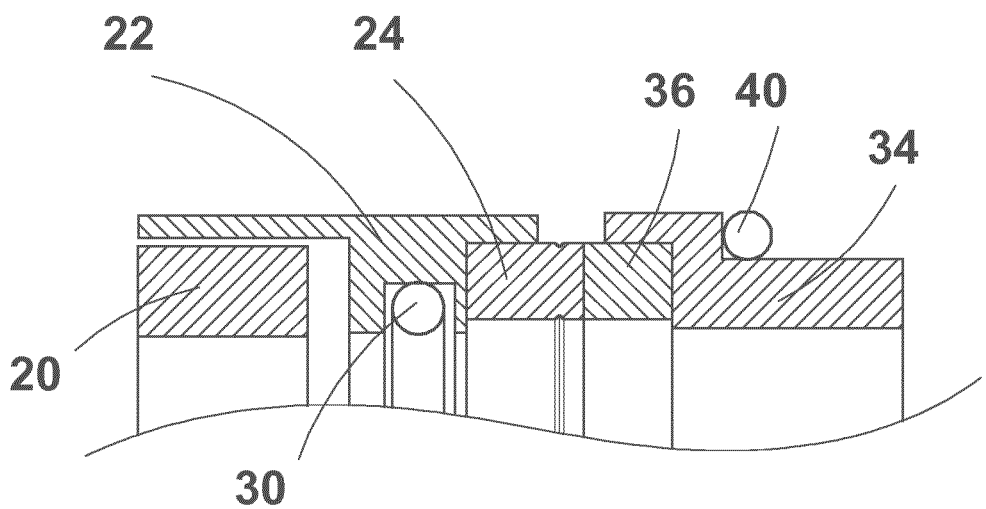
FIG. 2 illustrates the mechanical seal in accordance with a first preferred embodiment of the present invention.

In accordance with FIGS. 1 and 2 the mechanical seal 10 comprises a rotary part 18 and a non-rotary part 32. The rotary part 18 comprises a retainer ring 20, a rotary slide ring carrier 22, a rotary slide ring 24, at least one set screw 26, one or more springs 28 and an O-ring 30. The non-rotary part 32 comprises a non-rotary slide ring carrier 34, a non-rotary slide ring 36, a body part 38, O-rings 40 and 42, a drive pin 44, a gland ring 46 and bolts 48. The seal is assembled on the shaft 12 such that the retainer ring 20 including the at least one spring 28 is fastened on the shaft 12 at an appropriate position by the at least one set screw 26. Next the rotary slide ring carrier 22 with the rotary slide ring 24 is pushed on the shaft such that the rotary slide ring carrier 22 remains floating on the shaft 12 by the support of the O-ring 30. Then the non-rotary slide ring 36 with its carrier 34 and the body part 38 with its O-rings 40 and 42 is installed on the shaft 12 to the support of the seal housing 16, and fastened thereto by the gland ring 46 and the bolts 48.

In accordance with FIG. 3, the rotary slide ring 24 has a first axial end 50, which is located in the seat in the rotary slide ring carrier 22 (see FIG. 2) and a second axial end 52 with an area and a slide surface facing a slide surface of the non-rotary slide ring 36, when in use. A circumferential groove 54 is disposed in the outer circumferential surface 56 of the rotary slide ring 24 at an axial distance d from the second axial end 52 of the rotary slide ring 24. FIG. 3 shows also another, optional circumferential groove 58 disposed in the inner circumferential surface 60 of the rotary slide ring 24. The two grooves 54 and 58 are opposite one another, i.e. their axial distances from the second axial end 52 of the rotary slide ring are equal, d. The non-rotary slide ring carrier 34 includes a, preferably, but not necessarily a piezoelectric, sensor 62, which is in wired or wireless communication with an external device monitoring, possibly among other things, the life and condition of the mechanical seal. The sensor 62 is one of an acoustic emission sensor, an acceleration sensor and a vibration sensor, just to name a few options without any intention to limit the scope of the patent to only the listed sensors. The sensors and the data processing arrangements discussed in GB-A-2439934 may be applied in putting the present invention to practice.

In accordance with FIG. 4, the non-rotary slide ring 36' has a first axial end 64, which is located in the seat in the non-rotary slide ring carrier 34 and a second axial end 66 with an area and a slide surface facing a slide surface of the rotary slide ring 24', when in use. A circumferential groove 68 is disposed in the outer circumferential surface 70 of the non-rotary slide ring 36' at an axial distance d' from the second axial end 66 of the non-rotary slide ring 36'. FIG. 4 shows also another, optional circumferential groove 72 disposed in the inner circumferential surface 74 of the non-rotary slide ring 36'. The two grooves 68 and 72 are opposite one another, i.e. their axial distances from the second axial end of the rotary slide ring are equal, d'. The non-rotary slide ring carrier 34 includes a sensor 62, which is in wired or wireless communication with an external device monitoring the life of the mechanical seal. The sensor 62 is one of an acoustic emission sensor, an acceleration sensor and a vibration sensor, just to name a few options without any intention to limit the scope of the patent to only the listed sensors. The sensors and the data processing arrangements discussed in GB-A-2439934 can be applied in putting the present invention to practice.

In view of the above discussed embodiments it should be understood that, firstly, the circumferential groove in the slide ring can be located in either the inner or outer circumferential surface of the slide ring, or in both, and secondly, that the groove/s can be located either in the rotary or in the non-rotary slide ring. As to the shape of the groove it has a few practical limitations. It is preferable, but not entirely necessary, that the groove is V-shaped or, in any case, such that opens towards the envelope surface of the slide ring, i.e. the angle β between the groove side surface 54' (at a side of the second axial end 52 of the slide ring) and the circumferential surface 56 of the slide ring 24 (see FIG. 3) being blunt. The reason for such a design is that, when the above mentioned angle β is blunt, the wear of the slide ring does not result in loosening of any larger particles from the edge of the groove when the wear of the slide ring extends up to the groove. It is easy to imagine that, if the above mentioned angle were sharp, an annular part would be loosened from the edge of the groove, as in such a case the bottom, or in any case a deeper part, of the groove extends closer to the second axial end of the slide ring than the edge of the groove.

The above described sealing arrangement functions such that when the slide ring having the above discussed groove or grooves is worn up to the edge of the groove, the further wear of the slide ring results in the area (area at right angles to the axis of the slide ring) of the slide surface, i.e. the second axial end, of the slide ring starting to get smaller. As a result, the diminishing area of the second axial end or slide surface (of the slide ring having the groove/s) makes the acoustic emission from between the opposing slide surfaces change its frequency. In a similar fashion the frequency of the vibration of the slide ring changes as a function of the area of the slide surface. The sensor 62 passes the respective information, for instance frequency data, either periodically or continuously to the external device, can be called a control unit, monitoring the life of the mechanical seal that acts in a pre-programmed way. In other words, the external device or control unit has received frequency data since the mechanical seal was installed and, for instance, the flow machine was taken to use. The data, i.e. data from normal operating conditions, has been recorded or manipulated such that the control unit is provided with frequency information on the allowable operating range of the flow machine. Now that the control unit notices that the information, i.e. the frequency data, received from the seal is moved outside the allowable operating range, and possibly continues to change in a direction away from the allowable operating range the control unit can, for instance, perform one or more of the following tasks, light a warning light, give an audible signal, order a new sealing, or send a message to the service personnel.

The above discussed function can be accomplished with several optional arrangement as will be discussed in the following Figures.

Figure 5:
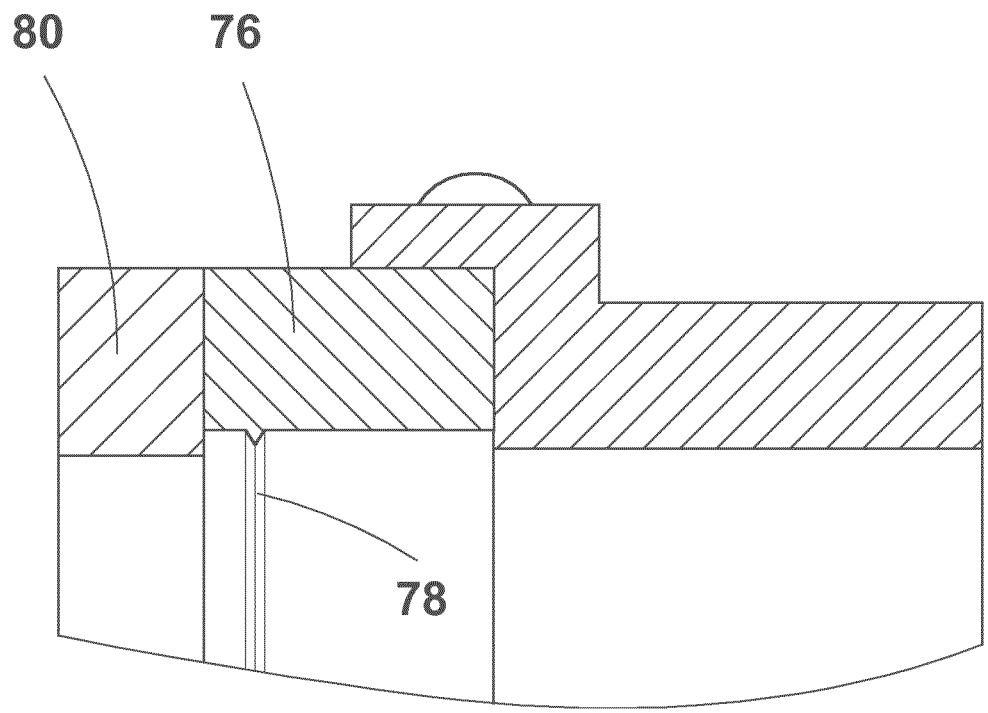
FIG. 5 illustrates an enlarged cross section of a part of the mechanical seal in accordance with a third preferred embodiment of the present invention.

FIG. 5 illustrates an enlarged cross section of a part of the mechanical seal in accordance with a third preferred embodiment of the present invention. Here the non-rotary slide ring 76 is provided with an internal ridge 78 on its inner circumferential surface. A feature essential for the working of this embodiment of the present invention is that the inner circumferential surface of the rotary slide ring 80 extends closer to the axis of the seal than the inner circumferential surface of the non-rotary slide ring so that the ridge, when the non-rotary slide ring is worn up to the ridge, starts to wear, too. In this embodiment, the enlarging area of the second end of the non-rotary slide ring makes the acoustic emission or vibration from between the opposing slide surfaces change its frequency. Naturally, it is clear that the ridge can be located on the outer circumferential surface of the non-rotary slide ring, too, as long as the outer circumferential surface of the rotary slide ring extends farther away from the axis as that of the non-rotary slide ring. Also, the ridge can be arranged on both sides of the non-rotary slide ring, just like the groove in the earlier embodiments. Also, it is clear that the ridge can as well be arranged on the inner or outer circumferential surface, or on both, of the rotary slide ring, whereby the inner and outer circumferential surface, or both, of the non-rotary slide ring should extend farther away from the axis that those of the rotary slide ring.

Figure 6:
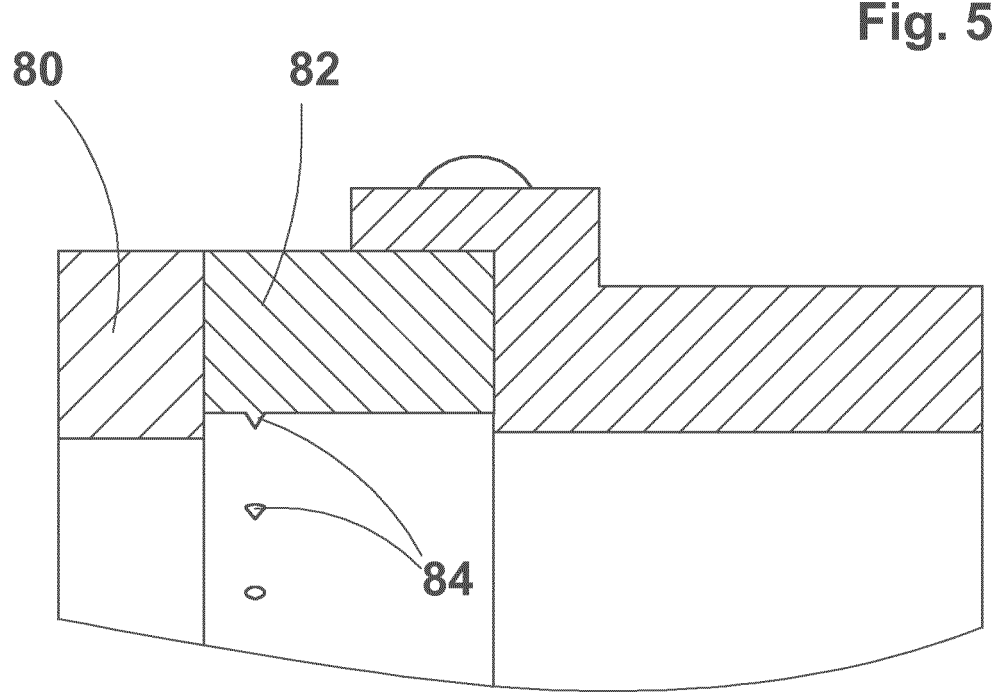
FIG. 6 illustrates an enlarged cross section of a part of the mechanical seal in accordance with a fourth preferred embodiment of the present invention.

FIG. 6 illustrates an enlarged cross section of a part of the mechanical seal in accordance with a fourth preferred embodiment of the present invention. Here, the non-rotary slide ring 82 is disposed on its inner circumferential surface with at least one protrusion or bulge 84, which, after the non-rotary slide ring has worn to a certain degree, meets the surface of the rotary slide ring 80, and makes the acoustic emission from between the opposing slide surfaces change its frequency. In an embodiment with a plurality of bulges, the array of bulges is preferably arranged on the same circumference, i.e. at an equal distance from the slide surface. Naturally, it is clear that the bulge/s can be located on the outer circumferential surface of the non-rotary slide ring, too, as long as the outer circumferential surface of the rotary slide ring extends farther away from the axis as that of the non-rotary slide ring. Also, the bulge/s can be arranged on both sides of the non-rotary slide ring, just like the grooves in the earlier embodiments. Also, it is clear that the bulge/s can as well be arranged on the inner or outer circumferential surface, or on both, of the rotary slide ring, whereby the inner and outer circumferential surface, or both, of the non-rotary slide ring should extend farther away from the axis that those of the rotary slide ring.

In other words, in the third and fourth embodiments of the present invention the slide surface of the slide ring facing the slide ring having the ridge/s or the bulge/s changing the area of the second end of the slide ring should have a radial extension to the same direction, inwards or outwards, as in which direction the ridge/s or bulge/s extend. The radial extension should be at least equal with the radial height of the ridge/s or bulge/s.

Figure 7:
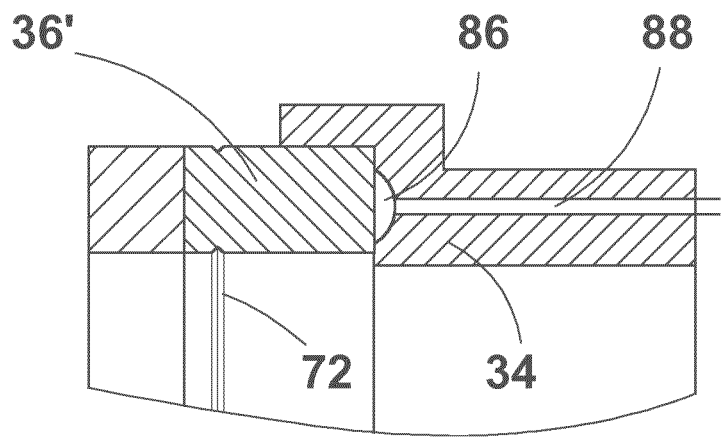
FIG. 7 illustrates an enlarged cross section of a part of the mechanical seal in accordance with a fifth preferred embodiment of the present invention.

FIG. 7 illustrates an enlarged cross section of a part of the mechanical seal in accordance with a fifth preferred embodiment of the present invention. Here, the non-rotary slide ring 36' having the groove/s 72, though the existence of the groove/s or any other element changing the cross section of the non-rotary slide ring in the non-rotary slide ring 36' is not a necessary feature for the working of the invention, the groove or grooves can be disposed in the rotary slide ring, too, includes the acoustic emission, the acceleration or the vibration sensor 86 having its wiring 88 passing through a drilled hole in the non-rotary slide ring carrier 34.

Figure 8:
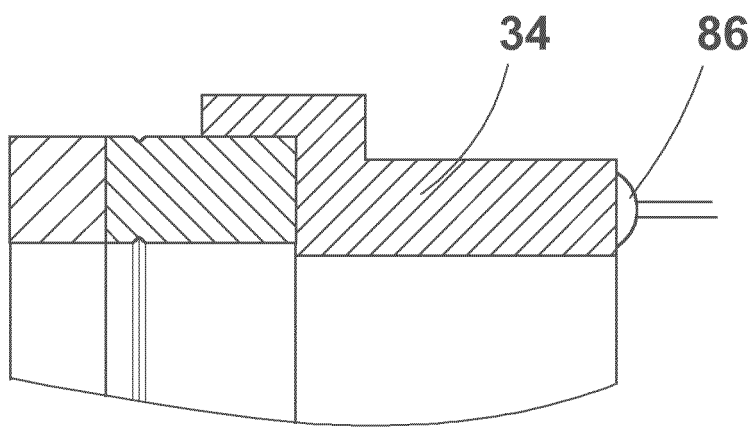
FIG. 8 illustrates an enlarged cross section of a part of the mechanical seal in accordance with a sixth preferred embodiment of the present invention.

FIG. 8 illustrates an enlarged cross section of a part of the mechanical seal in accordance with a sixth preferred embodiment of the present invention. Here, the acoustic emission, the acceleration or the vibration sensor 86 includes the axial end of the non-rotary slide ring carrier 34, and not on the outer circumferential surface thereof as shown in FIGS. 3-6.

Figure 9:
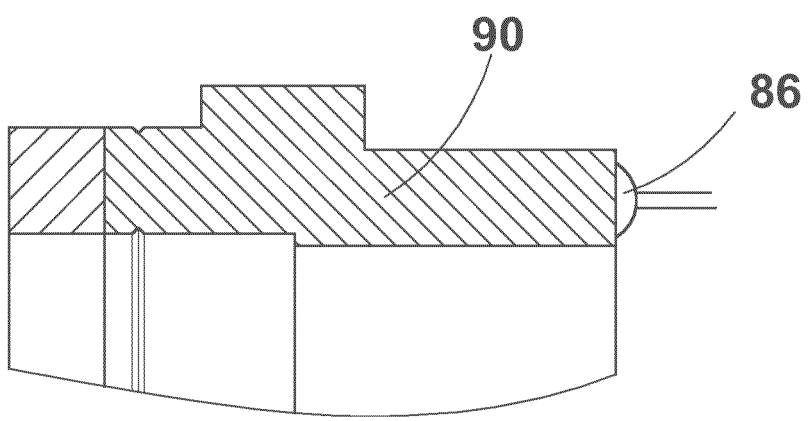
FIG. 9 illustrates an enlarged cross section of a part of the mechanical seal in accordance with a seventh preferred embodiment of the present invention.

FIG. 9 illustrates an enlarged cross section of a part of the mechanical seal in accordance with a seventh preferred embodiment of the present invention. Here, the non-rotary slide ring carrier and the non-rotary slide ring 90 are made of the same material, whereby there is no separate slide ring carrier but the slide ring is capable of performing the tasks of both the slide ring and its carrier. The acoustic emission, the acceleration or the vibration sensor 86 is attached to the axial end of the slide ring 90, but the sensor could as well be located on the outer circumferential surface of the non-rotary slide ring 90, too.

As to the material of the rotary and non-rotary slide rings, it is a preferred but not a necessary feature of the present invention that the material of the slide ring having the groove/s, ridge/s or bulge/s is softer than that of the opposing slide surface. Thereby it is the material of the slide ring having the groove/s, ridge/s or bulge/s that wears most and not that of the opposing slide ring.

It should also be understood that the acoustic emission sensor, the acceleration sensor or the vibration sensor can be positioned in any such location or position where it is capable of collecting information from the wear of the slide ring/s. In other words, such a sensor can not only be arranged in direct connection with the slide ring or slide ring carrier but also in the wall of the seal housing, in the cover of the pump or mixer casing or in the flange used for fastening the sealing to the flow machine, just to name a few alternatives without any indication to limit the invention to the listed options. In other words, the phrase "in communication with the mechanical seal" refers to all such positions in the flow machine where the acoustic emission, acceleration or vibration of the seal ring can be recorded by the respective sensor.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above can be used in connection with another embodiment when such combination is technically feasible.

The invention claimed is:

1. A mechanical seal, comprising:
a rotary part including at least a rotary slide ring and a rotary slide ring carrier, the rotary slide ring having a first axial end located in a seat in the rotary slide ring carrier, and a second axial end with an area and a rotary slide surface;
a non-rotary part including at least a non-rotary slide ring and a non-rotary slide ring carrier, the non-rotary slide ring having a first axial end located in a seat in the non-rotary slide ring carrier, and a second axial end with an area and a non-rotary slide surface;
a sensor in communication with the mechanical seal configured to collect information from at least one of the rotary slide ring and the non-rotary slide ring; and
a circumferential groove positioned on a circumferential surface in one of the rotary slide ring or the non-rotary slide ring at a distance spaced from the rotary slide surface or the non-rotary slide surface and closer to the rotary slide surface or the non-rotary slide surface of the second axial end of the one of the rotary slide ring or the non-rotary slide ring than the first axial end of the one of the rotary slide ring and the non-rotary slide ring, such that when the one of the rotary slide ring or the non-rotary slide ring is worn up to an edge of the circumferential groove, further wear of the one of the rotary slide ring or the non-rotary slide ring results in a diminishing area of the second axial end of the one of the rotary slide ring or the non-rotary slide ring, and the circumferential groove has two side surfaces, and an angle, measured within one of the rotary slide ring or the non-rotary slide ring, between the side surface closer to the second axial end of one of the rotary slide ring or the non-rotary slide ring and the circumferential surface of the one of the rotary slide ring and the non-rotary slide ring is closer to the second axial end of one of the rotary slide ring or the non-rotary slide ring, is obtuse.

2. The mechanical seal as recited in claim 1, wherein the rotary slide ring has an inner circumferential surface and an outer circumferential surface, the non-rotary slide ring has an inner circumferential surface and an outer circumferential surface, the circumferential groove is disposed in at least one of the inner circumferential surface and the outer circumferential surface of the one of the rotary slide ring and the non-rotary slide ring.

3. The mechanical seal as recited in claim 1, wherein the one of the rotary slide ring and the non-rotary slide ring having the circumferential groove is made of softer material than an opposite one of the rotary slide ring and the non-rotary slide ring.

4. The mechanical seal as recited in claim 1, wherein the mechanical seal is a single-acting mechanical seal or a double-acting mechanical seal.

5. The mechanical seal as recited in claim 1, wherein the sensor is in connection with one of the non-rotary slide ring and the non-rotary slide ring carrier.

6. The mechanical seal as recited in claim 1, wherein the sensor is an acoustic emission sensor.

7. The mechanical seal as recited in claim 1, wherein the sensor is an acceleration sensor.

8. The mechanical seal as recited in claim 1, wherein the sensor is a vibration sensor.

* * * * *